United States Patent
Aksit et al.

(10) Patent No.: US 6,568,903 B1
(45) Date of Patent: May 27, 2003

(54) SUPPLEMENTAL SEAL FOR THE CHORDAL HINGE SEALS IN A GAS TURBINE

(75) Inventors: Mahmut Aksit, Istanbul (TR); Abdul-Azeez Mohammed-Fakir, Schenectady, NY (US); Ahmad Safi, Troy, NY (US); Srikanth Vedantam, Niskayuna, NY (US); Ning Fang, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/029,002

(22) Filed: Dec. 28, 2001

(51) Int. Cl.[7] ................................................ F01D 9/04
(52) U.S. Cl. .................. 415/191; 415/209.2; 415/209.3
(58) Field of Search .............................. 415/191, 209.2, 415/209.3, 231; 277/641, 644, 647

(56) References Cited

U.S. PATENT DOCUMENTS

| | | |
|---|---|---|
| 4,184,689 A | 1/1980 | Brodell et al. |
| 4,815,933 A | 3/1989 | Hansel et al. |
| 5,149,250 A * | 9/1992 | Plemmons et al. ...... 415/209.3 |
| 5,271,714 A | 12/1993 | Shepherd et al. |
| 5,372,476 A * | 12/1994 | Hemmelgarn et al. ...... 415/135 |
| 6,095,750 A * | 8/2000 | Ross et al. .................. 415/189 |

* cited by examiner

Primary Examiner—Ninh H. Nguyen
(74) Attorney, Agent, or Firm—Nixon & Vanderhye

(57) ABSTRACT

In a gas turbine having a chordal hinge seal between an inner rail of each nozzle segment and an annular axially facing sealing surface of a nozzle support ring, a supplemental seal is disposed between the support ring and inner band of the nozzle segment on a lower pressure side of the chordal hinge seal. To minimize or prevent leakage flow across the chordal hinge seal, a generally U-shaped portion seals between radially opposed surfaces of the nozzle support ring and inner band, the legs of the U-shaped portion engaging those surfaces. In a further embodiment, an arcuate sheet metal supplemental seal having a sinuous shape is disposed and seals between the radially opposed surfaces of the nozzle support ring and inner band, respectively.

16 Claims, 6 Drawing Sheets ary array or
SUPPLEMENTAL SEAL FOR THE CHORDAL HINGE SEALS IN A GAS TURBINE

BACKGROUND OF THE INVENTION

The present invention relates to seals in a gas turbine for supplementing the chordal hinge seals between turbine nozzles and a turbine nozzle support ring and particularly relates to supplementary seals for substantially minimizing or eliminating leakage losses past the chordal hinge seals.

In a gas turbine, hot gases of combustion flow from combustors through first-stage nozzles and buckets and through the nozzles and buckets of follow-on turbine stages. The first-stage nozzles typically include an annular array or assemblage of cast nozzle segments each containing one or more nozzle stator vanes per segment. Each first-stage nozzle segment also includes inner and outer band portions spaced radially from one another. Upon assembly of the nozzle segments, the stator vanes are circumferentially spaced from one another to form an annular array thereof between annular inner and outer bands. A nozzle retaining ring coupled to the outer band of the first-stage nozzles supports the first-stage nozzles in the gas flow path of the turbine. An annular nozzle support ring, preferably split at a horizontal midline, is engaged by the inner band and supports the first-stage nozzles against axial movement.

In an exemplary arrangement, eighteen cast segments are provided with two vanes per segment. The annular array of segments are sealed one to the other along adjoining circumferential edges by side seals. The side seals seal between a high pressure region radially inwardly of the inner band, i.e., compressor discharge air at high pressure, and the hot gases of combustion in the hot gas flow path which are at a lower pressure.

Chordal hinge seals are used to seal between the inner band of the first-stage nozzles and an axially facing surface of the nozzle support ring. Each chordal hinge seal includes an axial projection which extends linearly along a chord line of the inner band portion of each nozzle segment. Particularly, the chordal hinge seal extends along an inner rail of each segment and which rail extends radially inwardly of the inner band portion. The chordal hinge seal projection lies in sealing engagement with the axially opposite facing sealing surface of the nozzle support ring.

During operation and/or repair of the first-stage nozzle, it has been found that warpage can leave gaps between the chordal hinge seals and the sealing surface of the nozzle support ring. These gaps enable leakage past the chordal hinge seals from the high pressure area radially within the annular inner band into the hot gas flow path. That is, the chordal hinge seals are inadequate to prevent leakage flow as the chordal hinge seal projections lose contact with the sealing surface of the nozzle support ring. Consequently, there is a need for a supplemental seal at the interface of the first-stage nozzles and nozzle support ring to minimize or eliminate the leakage flow past the chordal hinge seals.

BRIEF DESCRIPTION OF THE INVENTION

In accordance with a preferred embodiment of the present invention, there is provided a supplemental seal between the first-stage nozzles and the nozzle support ring which eliminates or minimizes leakage past the chordal hinge seals and which is readily and easily installed without reconfiguration of the first-stage nozzles or nozzle support ring. In a first embodiment hereof, segmented sheet metal supplemental seals are disposed in an annular cavity defined between radially inwardly and outwardly facing surfaces of the inner band of the nozzle segments and the nozzle support ring, respectively. The cavity is also defined by an annular axial facing surface of the first-stage nozzles, i.e., an annular surface along the radially inwardly extending inner rails of the inner band.

The supplemental seal, in this first embodiment, includes a plurality of arcuate sheet metal seal sections each having a generally U-shape in circumferential cross-section and a radially inwardly extending first anchor leg or support portion. This first anchor leg is disposed between the annular facing surfaces of the nozzle support ring and the inner rails at a location radially outwardly of the chordal hinge seals. The second and third portions, i.e., the legs of the U-shaped seal, bear against the radial inner and outer surfaces of the inner band and nozzle support ring, respectively. The base of the U-shaped section is spaced from the axial surface of the inner rail. Should leakage air flow past the first portion of the supplemental seal, the leakage air enters the region bounded by the inner rails and the second and third portions, i.e., the legs, of the U-shaped supplemental seal. This leakage air forces those portions against the radially inner and outer surfaces of the inner band and nozzle support ring, respectively, thereby substantially preventing leakage flow into the hot gas path.

In another form of the present invention, generally arcuately extending supplemental seal sections having a sinuous shape in circumferential cross-section are provided and form an annular supplemental seal. Apices of the sinuous seal sections alternately engage against the radially inner and outer surfaces of the inner band and nozzle support ring, respectively. Anchor legs or first portions of these supplemental seal sections, as in the first embodiment, extend between the annular sealing surface of the nozzle support ring and the inner rails radially outwardly of the chordal hinge seals. To the extent any leakage past the chordal hinge seals pass the anchor legs of the supplemental seal sections, such leakage flow biases the apices of the sinuous seal sections into engagement with the sealing surfaces along the inner band and the nozzle support ring to substantially prevent any leakage flow past the chordal seals into the hot gas path.

In a preferred embodiment according to the present invention, there is provided a gas turbine comprising a turbine nozzle support ring having a generally axially facing first surface, a turbine nozzle segment having at least one stator vane and including an inner band having a second surface in axial opposition to the first surface, the support ring and a portion of the inner band of the segment defining a cavity generally radially outwardly of the first surface and in part defined by generally axially extending radially opposed surfaces of the support ring and the inner band and a flexible seal in the cavity including a seal body having a first portion extending between the first and second surfaces and second and third portions engageable with the radially opposed surfaces, respectively, to seal between high and low pressure regions on opposite sides of the axially registering first and second surfaces of the support ring and the inner band.

In a further preferred embodiment according to the present invention, there is provided a gas turbine comprising a turbine nozzle support ring having a generally axially facing annular first surface, a plurality of turbine nozzle segments each having at least one stator vane and including an inner band having a second surface, the second surfaces forming a second peripheral surface lying in axial opposition to the first annular surface, a first seal between the first and second surfaces for sealing between high and low pressure regions on opposite sides of the first seal and a secondary seal between the support ring and the nozzle segments on a side of the first seal exposed to the low pressure region for maintaining a seal between the high and low pressure regions upon leakage past the first seal.

DETAILED DESCRIPTION OF THE INVENTION

Figure 1:
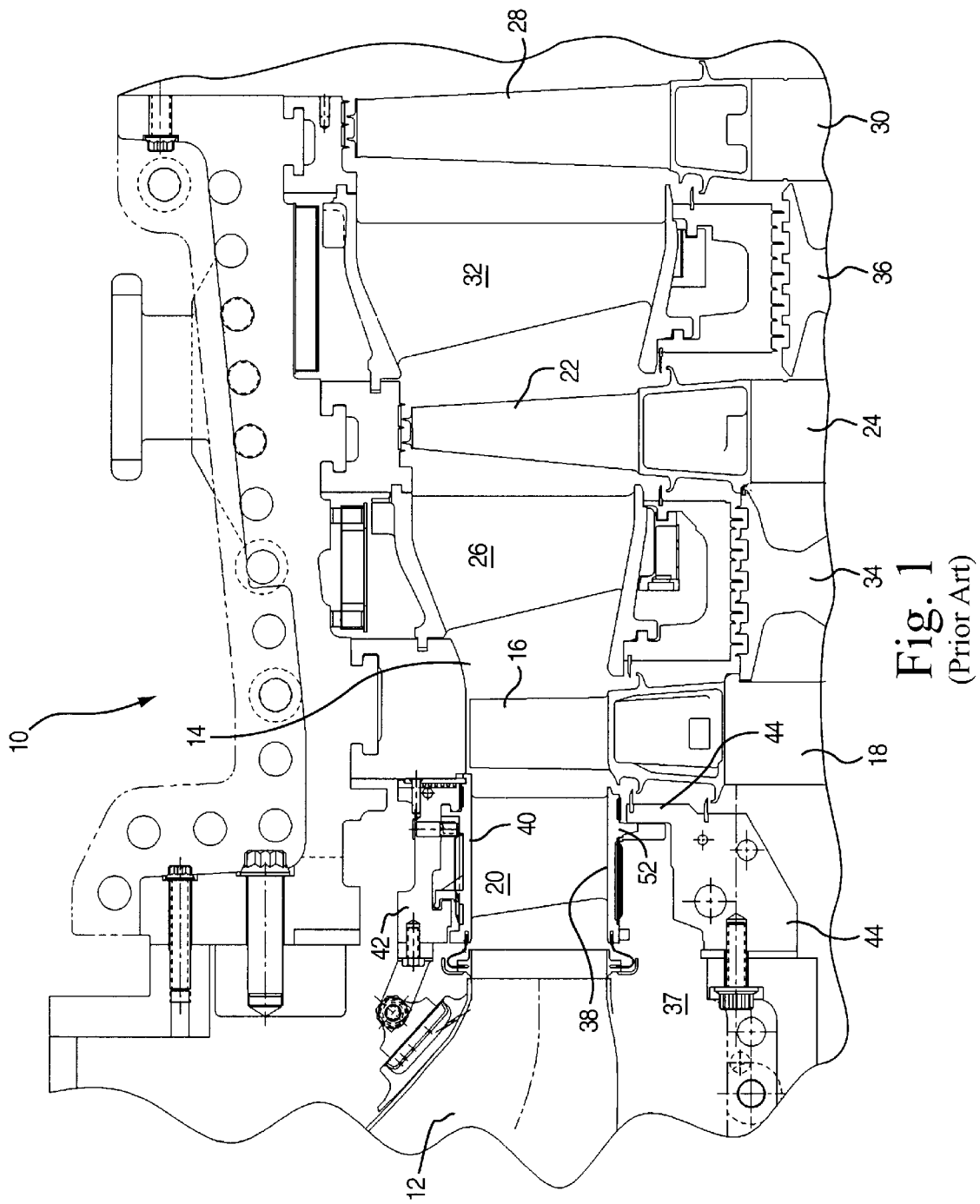
FIG. 1 is a fragmentary schematic side elevational view of a portion of a gas turbine.

Referring now to FIG. 1, there is illustrated a representative example of a turbine section of a gas turbine, generally designated 10. Turbine 10 receives hot gases of combustion from an annular array of combustors, not shown, which transmit the hot gases through a transition piece 12 for flow along an annular hot gas path 14. Turbine stages are disposed along the hot gas path 14. Each stage comprises a plurality of circumferentially spaced buckets mounted on and forming part of the turbine rotor and a plurality of circumferentially spaced stator vanes forming an annular array of nozzles. For example, the first stage includes a plurality of circumferentially-spaced buckets 16 mounted on a first-stage rotor wheel 18 and a plurality of circumferentially-spaced stator vanes 20. Similarly, the second stage includes a plurality of buckets 22 mounted on a rotor wheel 24 and a plurality of circumferentially-spaced stator vanes 26. Additional stages may be provided, for example, a third stage comprised of a plurality of circumferentially-spaced buckets 28 mounted on a third-stage rotor wheel 30 and a plurality of circumferentially-spaced stator vanes 32. It will be appreciated that the stator vanes 20, 26 and 32 are mounted on and fixed to a turbine casing, while the buckets 16, 22 and 28 and wheels 18, 24 and 30 form part of the turbine rotor. Between the rotor wheels are spacers 34 and 36 which also form part of the turbine rotor. It will be appreciated that compressor discharge air is located in a region 37 disposed radially inwardly of the first stage and that such air in region 37 is at a higher pressure than the pressure of the hot gases flowing along the hot gas path 14.

Figure 2:
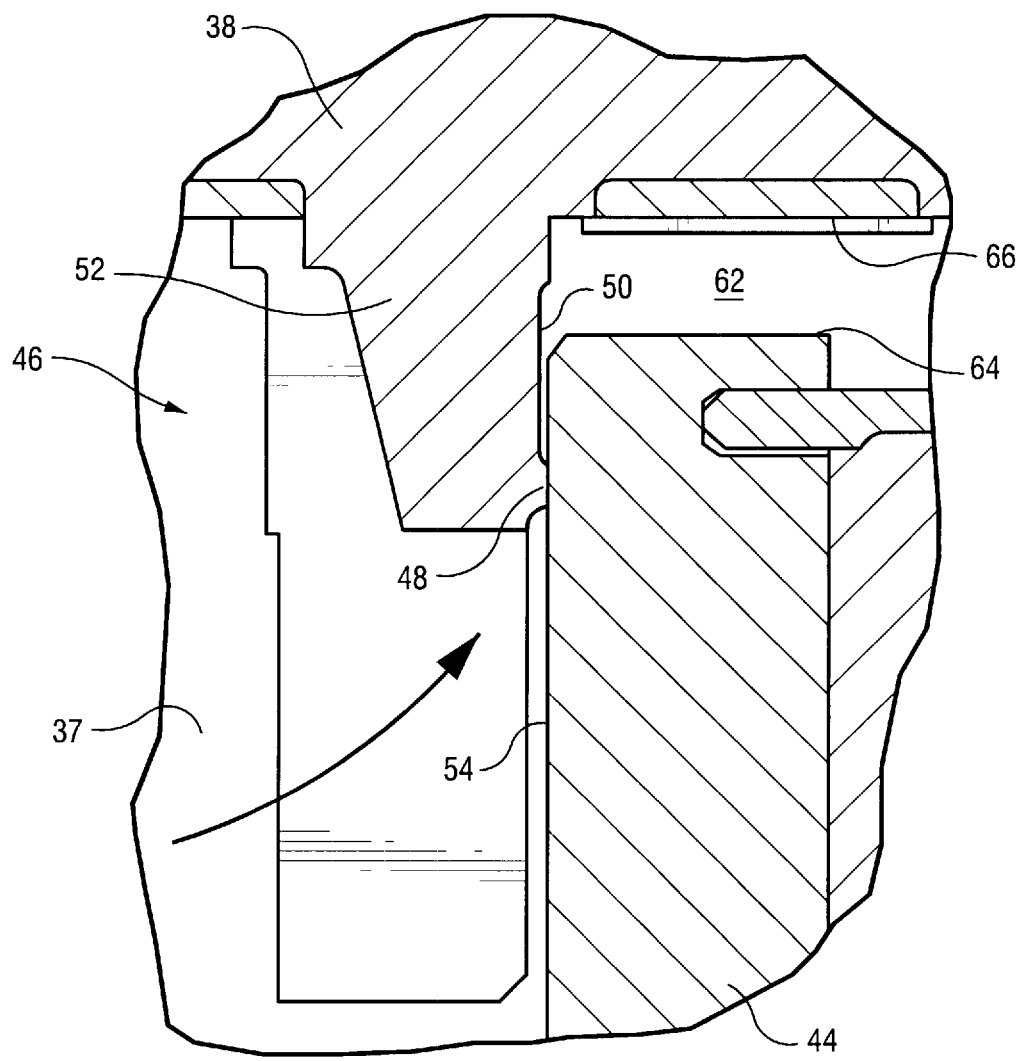
FIG. 2 is an enlarged fragmentary cross-sectional view illustrating a conventional chordal seal hinge.
Figure 3:
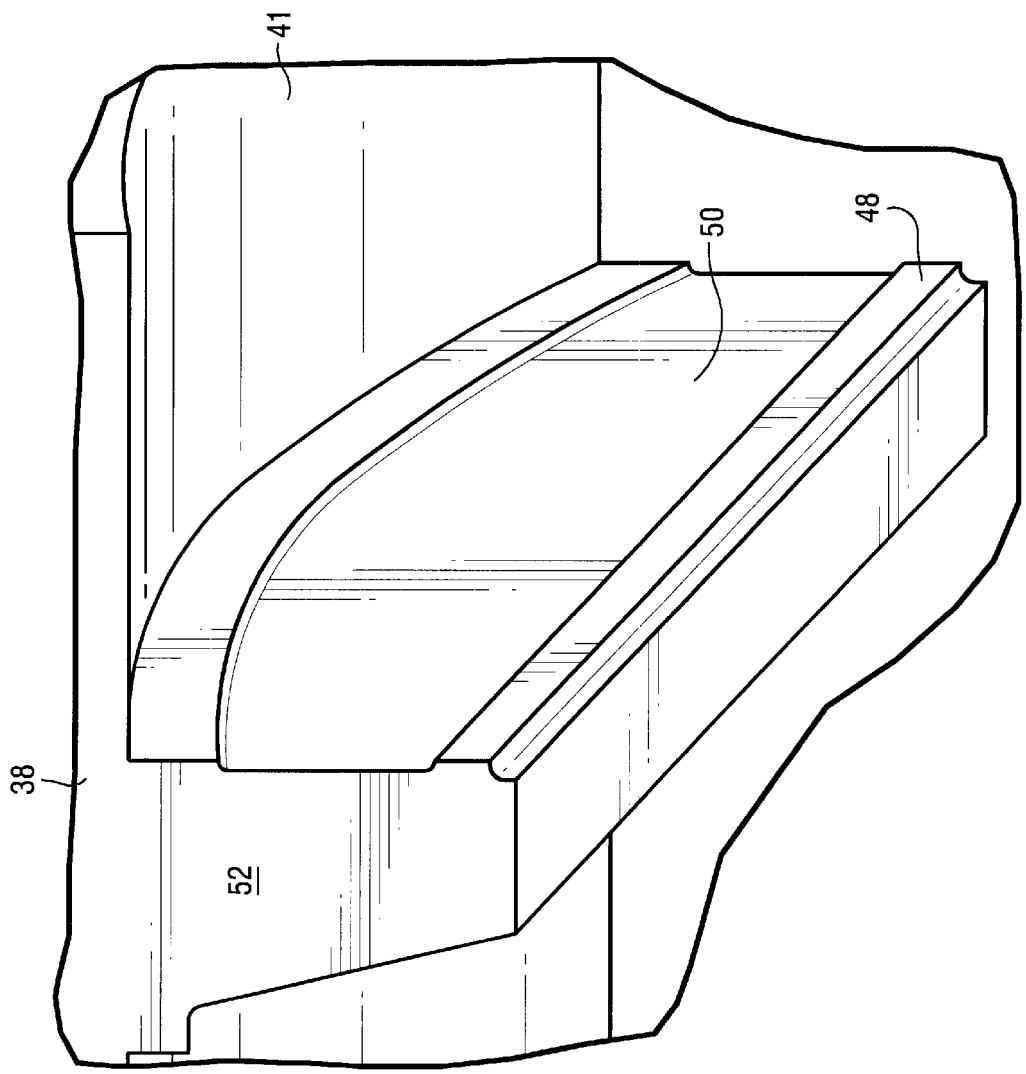
FIG. 3 is a fragmentary perspective view illustrating a portion of a conventional chordal hinge seal along an inner rail of a nozzle segment.
Figure 4:
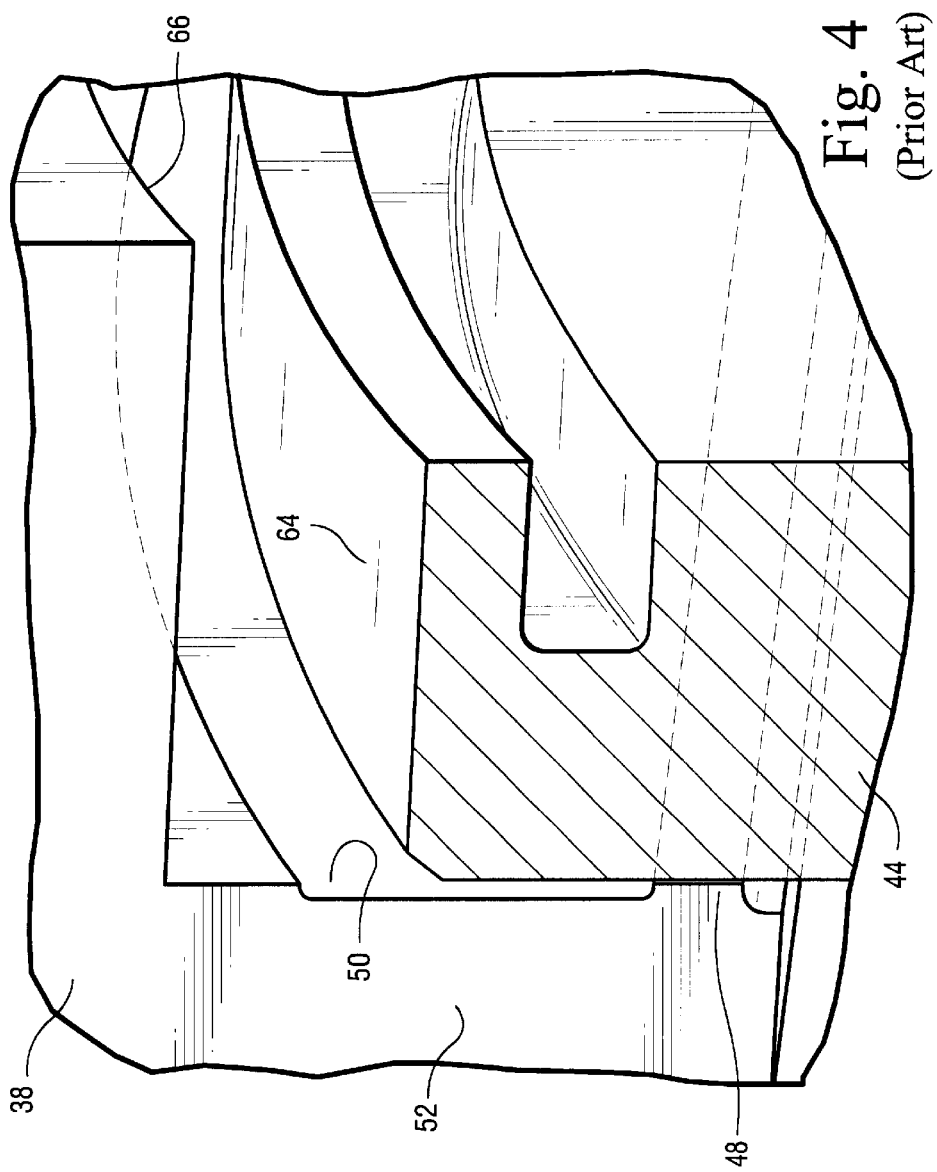
FIG. 4 is a fragmentary perspective view with parts in cross-section illustrating the conventional chordal hinge seal in sealing engagement with a nozzle support ring of the gas turbine.

Referring to the first stage of the turbine, the stator vanes 20 forming the first-stage nozzles are disposed between inner and outer bands 38 and 40, respectively, supported from the turbine casing. As noted above, the nozzles of the first stage are formed of a plurality of nozzle segments 41 (FIG. 3) each mounting one, preferably two, stator vanes extending between inner and outer band portions and arranged in an annular array of segments. A nozzle retaining ring 42 connected to the turbine casing is coupled to the outer band and secures the first-stage nozzle. A nozzle support ring 44 radially inwardly of the inner band 38 of the first-stage nozzles engages the inner band 38. Particularly, the interface between the inner band 38 and the nozzle support ring 44 includes an inner rail 52 (FIG. 2). The inner rail 52 includes a chord-wise, linearly extending axial projection 48, generally and collectively hereinafter referred to as a chordal hinge seal 46. Projection 48 extends along an axial facing surface 50 of the inner rail 52 which forms an integral part of each nozzle segment and specifically the inner band 38. The projection 48 engages a first annular surface 54 of the nozzle support ring 44. It will be appreciated that high pressure compressor discharge air lies in the region 37 and lower pressure hot gases flowing in the hot gas path 14 lie on the opposite side of the seal 48. The chordal hinge seal 46 thus is intended to seal against leakage from the high pressure region 37 into the lower pressure region of the hot gas path 14.

Figure 5:
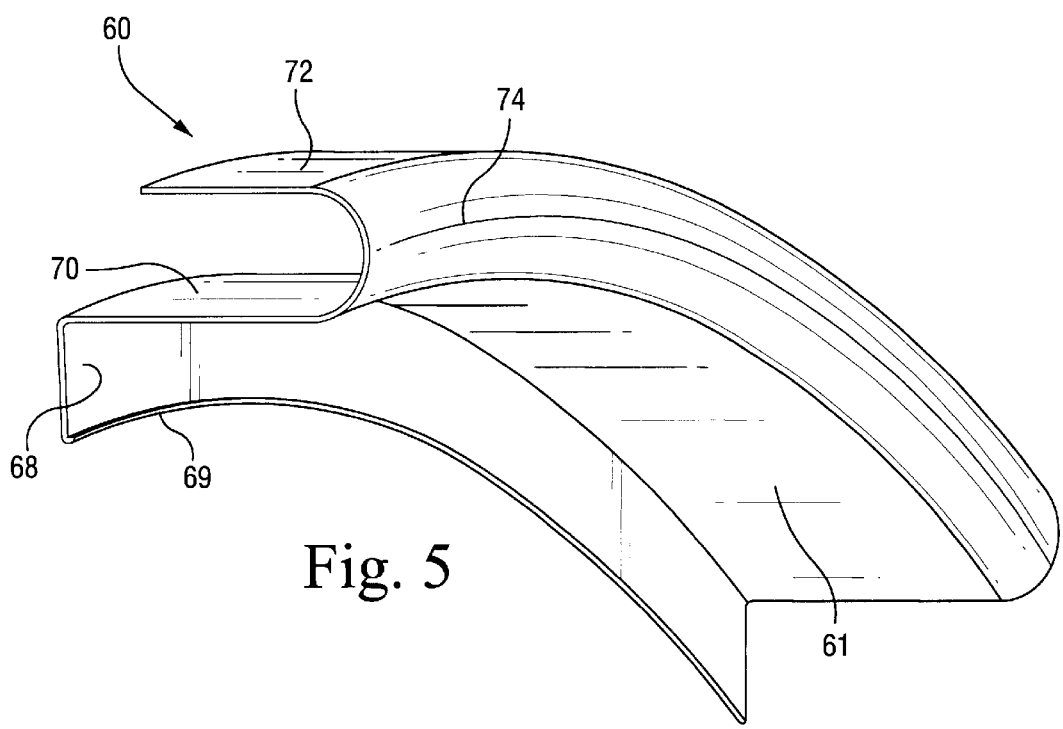
FIG. 5 is a fragmentary enlarged cross-sectional view illustrating a supplemental seal section according to a preferred embodiment of the present invention.
Figure 6:
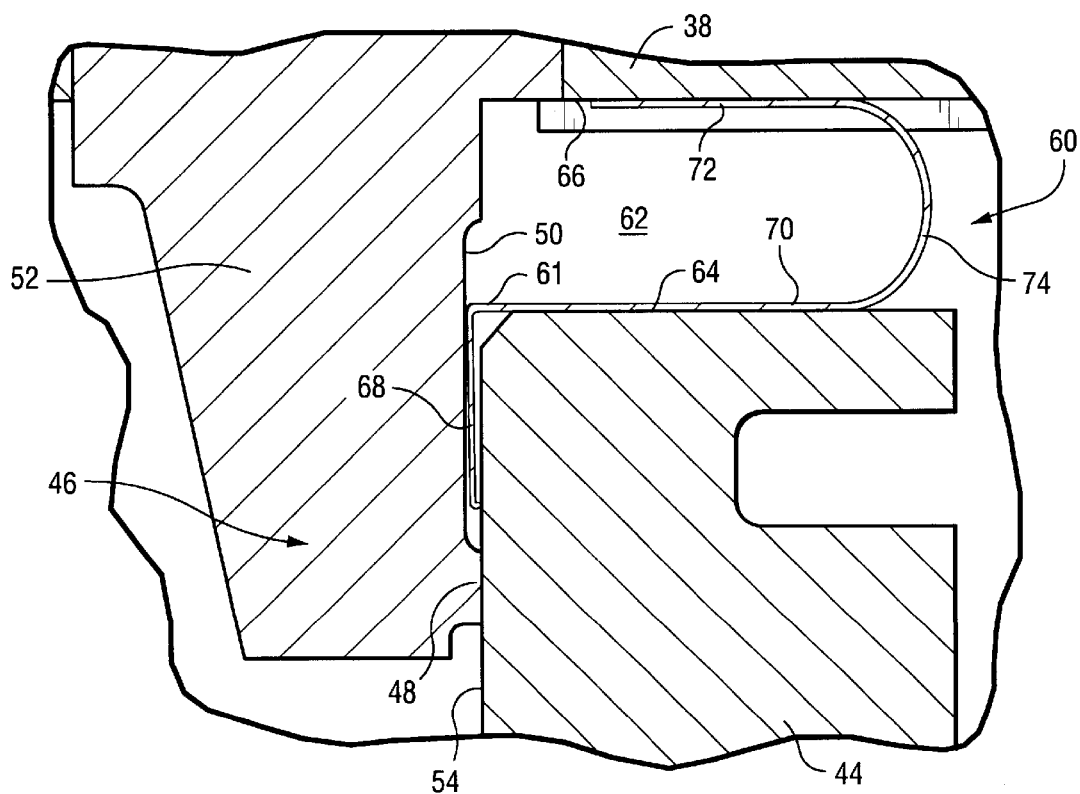
FIG. 6 is a fragmentary enlarged cross-sectional view illustrating the supplemental seal section of FIG. 5 in a gas turbine.

As noted previously, however, in operation, component parts of the nozzles and nozzle support ring will tend to form leakage gaps between the projection 48 and the surface 54 of the nozzle support ring 44 whereby leakage flow may occur from the high pressure region to the low pressure region. In order to minimize or prevent leakage flow into the hot gas path 14, and in accordance with a preferred embodiment of the present invention, there is provided a supplemental seal for sealing between the first-stage nozzles and the nozzle support ring 44. In a first embodiment hereof, there is provided a supplemental seal, generally designated 60 (FIGS. 5 and 6) for sealing between the nozzles and the nozzle support ring on the lower pressure side of the chordal hinge seal 46. From a review of FIG. 2, it will be appreciated that there is a cavity 62 radially outwardly of the chordal hinge seal 46 and which includes generally axially extending radially opposed surfaces 64 and 66 of the nozzle support ring 44 and the inner band 38, respectively. The supplemental seal 60 (FIG. 6) is disposed in the cavity 62 and includes a seal body 61 having a first leg or anchoring portion 68 extending between the axially opposed surfaces 50 and 54 of the inner rail 52 and nozzle support ring 44, respectively. The supplemental seal 60 is formed of sheet metal, extends arcuately, and has a generally U-shaped portion in circumferential cross-section with the first portion 68 extending radially inwardly. The U-shaped portion of seal 60 includes second and third seal portions 70 and 72 for sealing against the radially outer surface 64 of the nozzle support ring 44 and the radially inner surface 66 of the inner band 38.

The first portion or anchor leg 68 is disposed between the surfaces 50 and 54 of the inner rail 52 and the nozzle support ring 44. The distal edge of the first portion 68 is turned to form an arcuate lip 69 and the first portion 68 is preloaded to engage between surfaces 50 and 54, thus effecting a seal. That is, lip 69 engages surface 54 while the back side of portion 68 engages surface 50. The U-shaped portion of seal 60 is also preloaded. Consequently, second and third leg portions 70 and 72 engage against the radial outer surface 64 of the nozzle support ring 44 and the radial inner surface 66 of the inner band 38, respectively. Intermediate portion 74 connects the second and third portions to one another and spans cavity 62.

Figure 7:
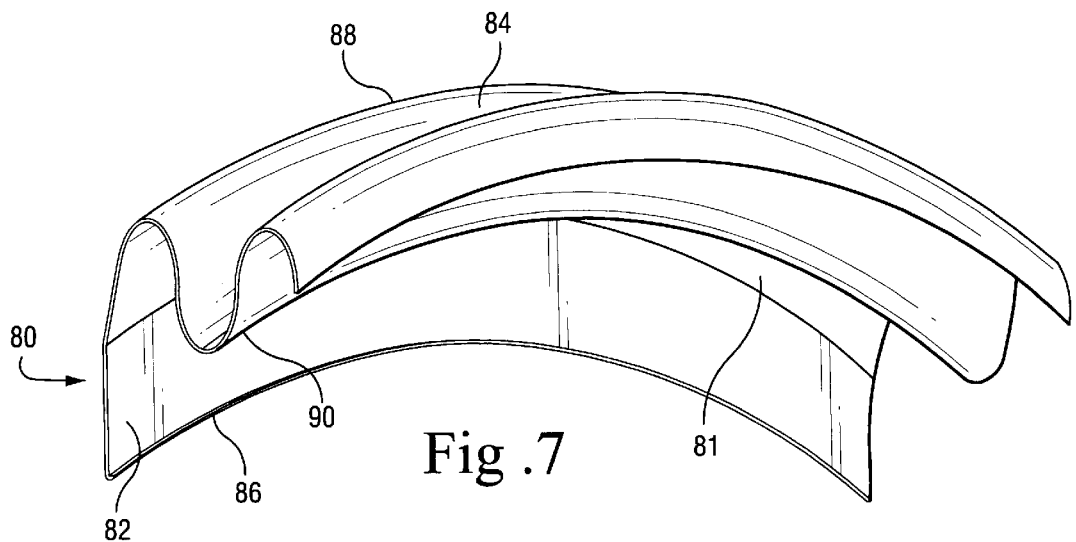
FIG. 7 is a perspective view of a supplemental seal section in accordance with a second preferred embodiment of the present invention.
Figure 8:
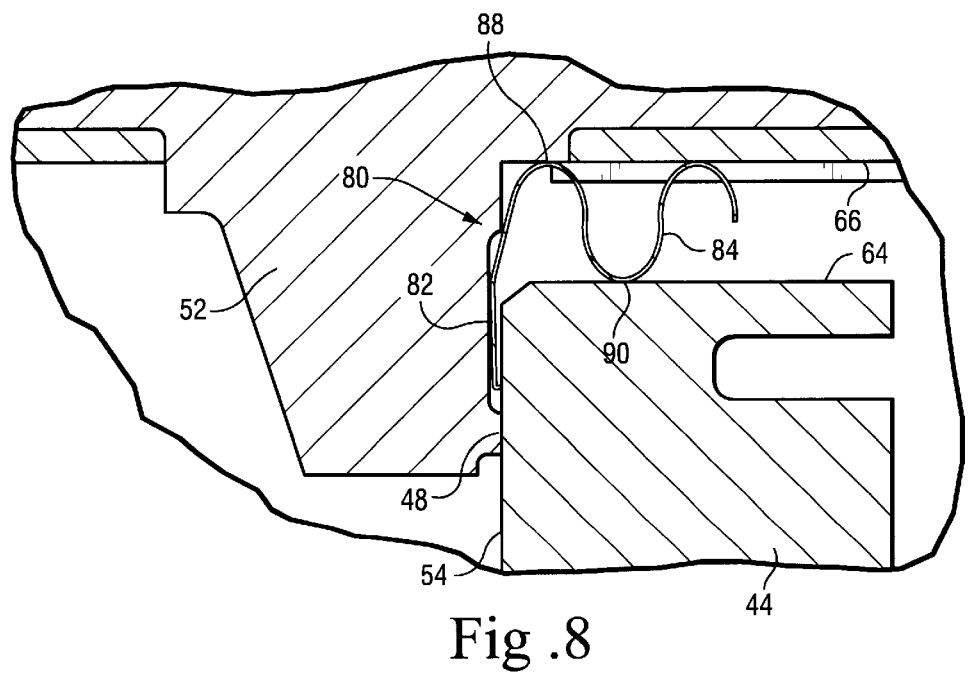
FIG. 8 is a fragmentary cross-sectional view illustrating the supplemental seal of FIG. 7 in a gas turbine.

Referring now to a second preferred embodiment of the present invention illustrated in FIGS. 7 and 8, a supplemental seal, generally designated 80, includes an arcuate sheet metal seal body 81 having a first portion or anchor leg 82 disposed between the surfaces 50 and 54 of the inner rail and nozzle support ring 44. From the anchor leg 82, the continuous metal sheet extends in circumferential cross-section to form a sinuous portion 84 extending between radially opposite surfaces 64 and 66 of the cavity 62. As in the previous embodiment, the first leg portion 82 has an axially projecting lip 86 and serves as a preloaded seal between the axially opposed surfaces 50, 54. The apices 88 and 90 of the sinuously formed sheet metal 84 are preloaded and seal against the radially opposed surfaces 64 and 66 of the nozzle support ring 44 and inner band 38, respectively.

The supplemental seals 60 and 80 are arcuate and have circumferential lengths greater than the circumferential lengths of the inner rail 52 of each nozzle segment. While not shown, the nozzle segments have side seals for sealing between the circumferentially adjacent segments at the joints therebetween. The seals 60 and 80 are provided in lengths which enable the seals to span the joints between the nozzle segments. For example, the seals may be provided in 90° or 180° lengths. Preferably, therefore, any end joints between ends of adjacent seals lie between opposite ends of the axially adjacent segment. Conversely, the joints between the nozzle segments lie opposite intermediate portions of the seals. Thus, the joints between the nozzle segments and the joints between the seals do not lie in axial registration with one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine comprising:
    a turbine nozzle support ring having a generally axially facing first surface;
    a turbine nozzle segment having at least one stator vane and including an inner band having a second surface in axial opposition to said first surface;
    said support ring and a portion of said inner band of said segment defining a cavity generally radially outwardly of said first surface and in part defined by generally axially extending radially opposed surfaces of said support ring and said inner band; and
    a flexible seal in said cavity including a seal body having a first portion extending between said first and second surfaces and second and third portions engageable with the radially opposed surfaces, respectively, to seal between high and low pressure regions on opposite sides of the axially registering first and second surfaces of said support ring and said inner band.

2. A gas turbine according to claim 1 wherein said cavity and said seal body are arcuate in a circumferential direction about an axis of the turbine.

3. A gas turbine according to claim 1 wherein said seal body comprises sheet metal.

4. A gas turbine according to claim 1 wherein the second and third portions of said seal body are connected to one another by an intermediate portion whereby said second, third and intermediate portions form a general U-shape with the intermediate portion spanning between the radially opposed surfaces, said seal body being preloaded to bias said second and third portions into sealing engagement with the radially opposed surfaces.

5. A gas turbine according to claim 1 wherein said first portion includes a lip of said seal body projecting generally axially, said first portion being preloaded to contact and seal between said axially opposed surfaces with said lip engaging and sealing against one of said opposed surfaces.

6. A gas turbine according to claim 1 wherein said cavity and said seal body are arcuate in a circumferential direction about an axis of the turbine, the second and third portions being arcuate and connected to one another by an intermediate arcuate portion, said first portion including a leg of said seal body preloaded to contact and seal between said axially opposed surfaces, said second, third and intermediate portions forming a general U-shape in the cavity and supported by said first portion between said axially opposed surfaces, said second, third and intermediate portions being preloaded to bias said second and third portions into sealing engagement with the radially opposed surfaces.

7. A gas turbine according to claim 1 wherein said second and third portions form part of a generally sinuously shaped seal body portion within said cavity with apices thereof engaging said radially opposed surfaces.

8. A gas turbine according to claim 7 wherein said first portion includes a leg of said seal body having a lip projecting generally axially and disposed between said axially opposed surfaces.

9. A gas turbine according to claim 7 wherein said cavity and said seal body are arcuate in a circumferential direction about an axis of the turbine.

10. A gas turbine according to claim 1 wherein one of said support ring and said segment includes an axially extending projection along an axial facing surface thereof for engagement with an axial facing surface of another of said support ring and said segment to form a seal therebetween.

11. A gas turbine comprising:
    a turbine nozzle support ring having a generally axially facing annular first surface;
    a plurality of turbine nozzle segments each having at least one stator vane and including an inner band having a second surface, said second surfaces forming a second peripheral surface lying in axial opposition to said first annular surface;
    a first seal between said first and second surfaces for sealing between high and low pressure regions on opposite sides of said first seal; and
    a secondary seal between said support ring and said nozzle segments on a side of said first seal exposed to said low pressure region for maintaining a seal between the high and low pressure regions upon leakage past said first seal.

12. A gas turbine according to claim 11 wherein said first seal includes a projection extending from one of said first and second surfaces for engagement against another of said first and second surfaces.

13. A gas turbine according to claim 12 wherein said projection extends linearly along said one of said first and second surfaces.

14. A gas turbine according to claim 11 wherein said secondary seal lies arcuately about an axis of the turbine and includes in cross-section a leg extending between said first and second surfaces in a generally radial direction and a generally U-shaped section extending in a generally axial direction from said leg for sealing between opposite surface portions of said support ring and said segments.

15. A gas turbine according to claim 11 wherein said secondary seal lies arcuately about an axis of the turbine and includes, in cross-section, a leg extending between said first and second surfaces in a generally radial direction and a generally sinuous portion extending in a generally axial direction from said leg with apices thereof sealing between opposite surface portions of said support ring and said segments.

16. A gas turbine according to claim 11 wherein said secondary seal is provided in segments, the segments having ends, the ends of adjacent seal segments being disposed intermediate opposite ends of the nozzle segments.

* * * * *